Patented Sept. 3, 1946

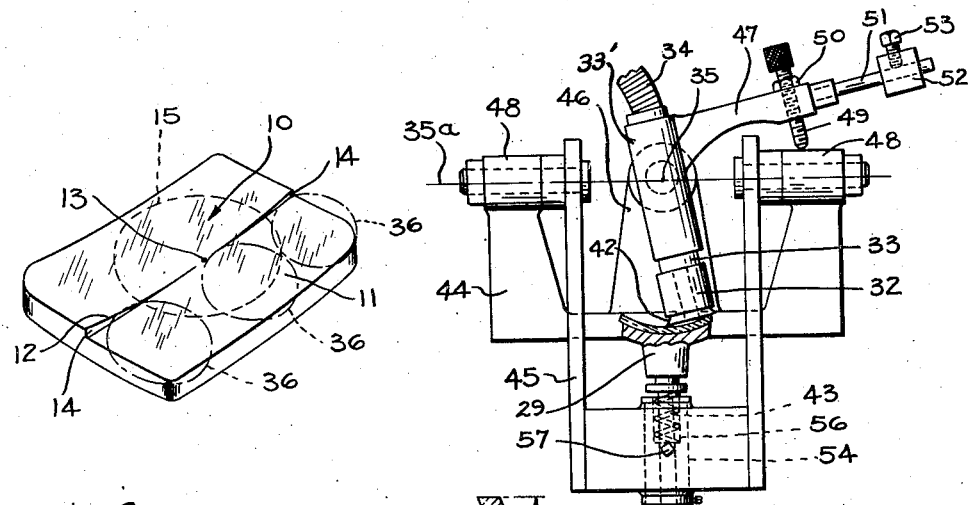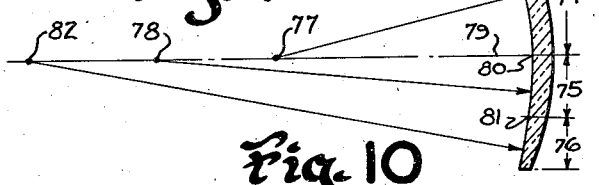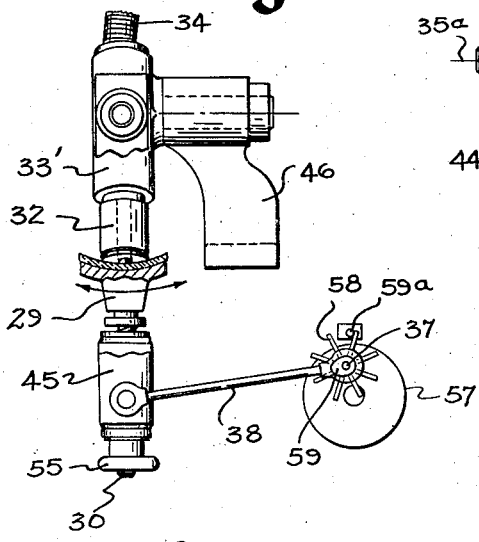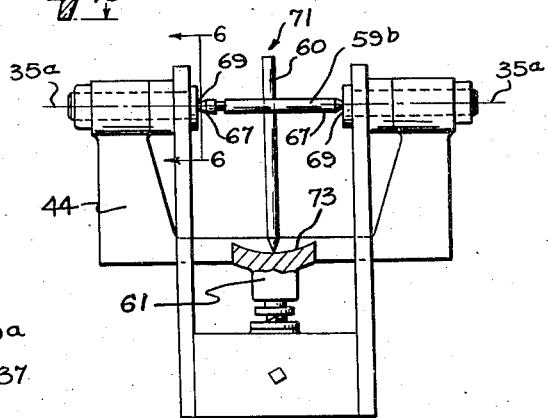

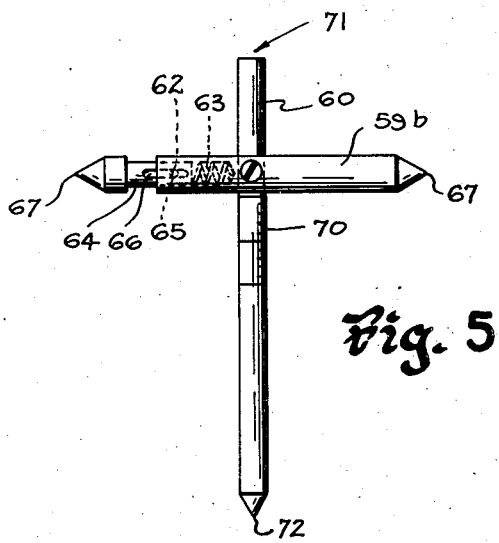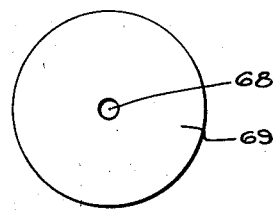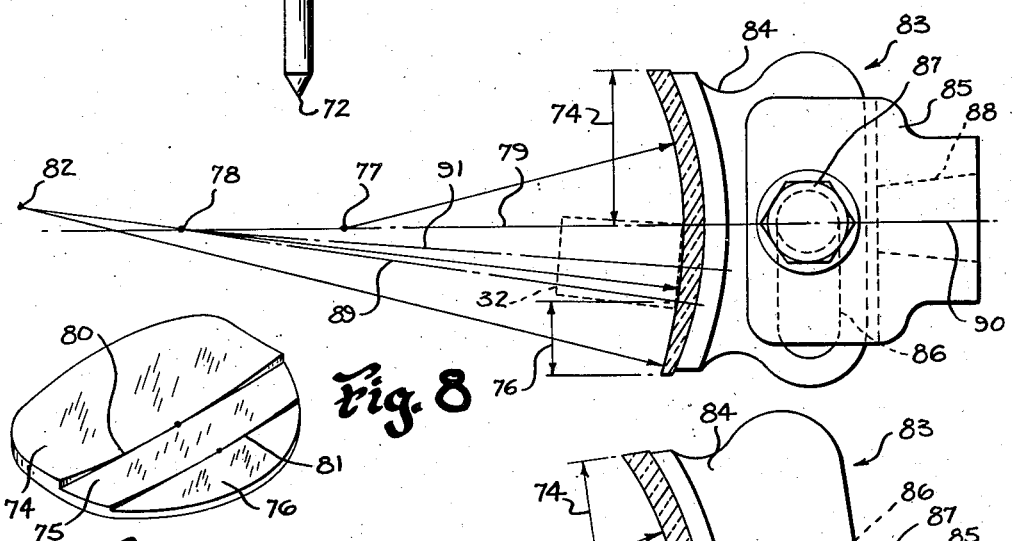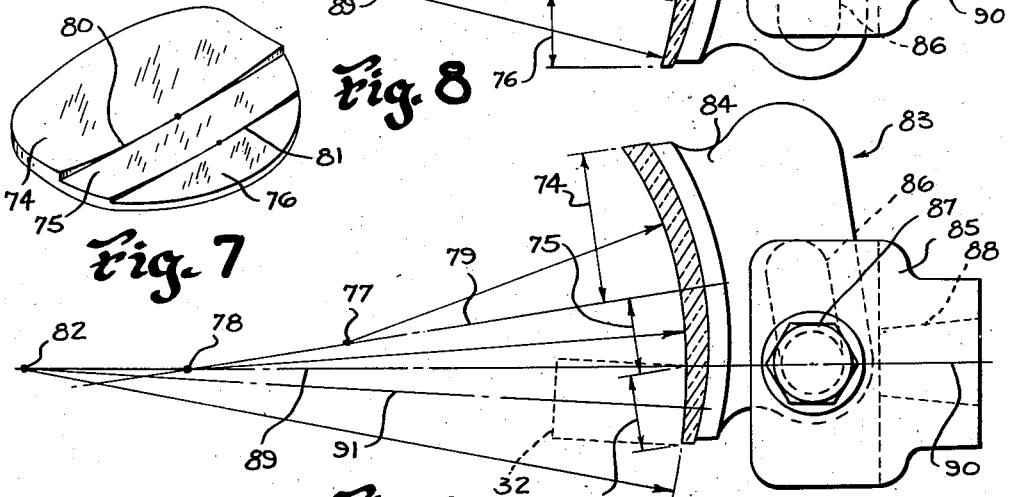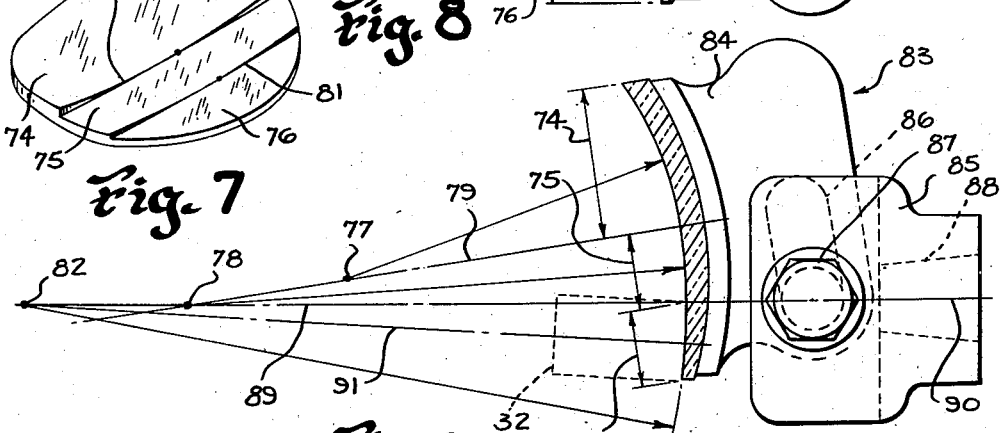

2,406,789

UNITED STATES PATENT OFFICE 2,406,789

ABRADING MACHINE

Ralph F. Bardwell, Southbridge, and John H. Smith, Taunton, Mass., assignors to American Optical Company, Southbridge, Mass., a voluntary association of Massachusetts Original application October 11, 1939, Serial No. 299,006, now Patent No. 2,310,925, dated February 16, 1943. Divided and this application January 4, 1943, Serial No. 471,249

7 Claims. (Cl. 51—124)

This invention relates to improvements in abrading machines and has particular reference to a machine for forming multifocal lenses.

This application is a division of our co-pending application Serial No. 299,006, filed October 11, 1939, now issued as Patent No. 2,310,925.

One of the principal objects of the invention is to provide simple and economical means for forming one of the focal fields of a one-piece multifocal lens in proper positional and optical relation with the other focal fields of said lens.

Another object is to provide a machine which will grind and polish the surface of the reading field or other focal fields of a multifocal lens without having to reblock the lens.

Another object of the invention is to provide a machine that will grind and polish a reading or other relatively short focus field on a one-piece multifocal lens, whereby the field will extend entirely across the width of the lens.

Another object of the invention is to provide a machine for grinding and polishing a near vision field on a multifocal lens whereby the field may be formed at any desired angle with the adjacent lens surfaces.

Another object of the invention is to provide in a machine of this nature a break up motion by oscillating the tool while grinding or polishing.

Another object is to provide accurate gauge means for setting a machine of this nature.

Other objects and advantages of the invention will become apparent from the following description taken in conjunction with the accompanying drawings. It is apparent that many changes in the details of construction and the arrangement of parts may be made without departing from the spirit of the invention as expressed in the accompanying claims. The invention, therefore, should not be limited to the exact details of construction as the preferred form only has been shown and described by way of illustration.

Referring to the drawings:

Fig. 1 is a perspective view of a lens blank illustrating the completion of the reading field;

Fig. 2 is a partial elevation of a lens grinding and polishing machine on which the reading field is generated;

Fig. 3 is a partial side view of the machine shown in Fig. 2;

Fig. 4 is a view similar to Fig. 2 illustrating the positioning and operation of the gauge for setting the machine to the desired cutting radius;

Fig. 5 is an enlarged view of portions of the radius gauge;

Fig. 6 is a partial view taken on line 6—6 of Fig. 5 with the gauge removed and looking in the direction of the arrows;

Fig. 7 is a perspective view of an alternate lens structure;

Fig. 8 is a view of a lens holder used in the forming of a lens of the type shown in Fig. 7;

Fig. 9 is a view similar to Fig. 8 with the holder in position for grinding a different field;

Fig. 10 is a central sectional view of the lens of Fig. 7, showing one arrangement for centering of the fields.

Lenses of one piece of lens material having two or more focal fields ground and polished thereon are very important in the art. The optical crown glass of which they are made is very stable and is one of the best lens medium known for lenses generally. The glass is stable, it does not corrode, and there is an absence of chemical changes, dispersion and color troubles, and difficulties of expansion, such as are in lenses of two or more pieces of different glass. Such lenses, however, have been difficult and expensive to grind and polish, and the proper relationship of the optical centers of the various fields has been particularly difficult and expensive to obtain. Due to these difficulties and the expense involved fused lenses wherein two or more pieces of different glasses are fused together have come into vogue. These lenses are subject to chemical change and tarnish, there are color troubles due to differences in dispersion and the lenses are liable to crack or separate because of the difference of expansion of the separate parts. It is, therefore, one of the prime objects of this invention to provide a machine which will grind and polish a surface on the reading field or surface on an intermediate field of a onepiece multifocal lens accurately and economically.

Referring to the drawings wherein similar reference characters represent similar parts throughout:

Fig. 1 shows a onepiece multifocal lens blank illustrating the completion of the reading field as accomplished with our device. The distance field is shown at 10, the lower or reading field is shown at 11. The two fields are separated by the straight division line 12. The fields 10 and 11 merge together substantially without a shoulder adjaecnt the center of the lens at 13, thus causing the line 12 to substantially disappear adjacent said center. There is a shoulder 14 between the fields 10 and 11 increasing in depth toward the outer edges. It will be noted that the reading field 11 is a wide field extending entirely across the lens. One form of a finished lens is cut from the blank as shown by the dotted line 15. The surface of the distance field 10 is formed by standard methods, the reading field 11 is ground and polished on a machine such as shown in Fig. 2 and Fig. 3 which includes a yoke-like support member 44 having a swingable U shaped lens holder support 45 pivoted thereon to swing about the axis 35a. An upright support member 46 is positioned substantially centrally of the yoke-like member 44 to one side of the axis 35a, and carries the spindle supporting member 33' housing a rotatable spindle 33 for pivotal movement about the axis 35, which is substantially perpendicular to the axis 35a. The spindle supporting member 33' has a side arm 47 integral therewith and extending over a bearing 48 of the yoke 44. The side arm 47 has a set screw 49 extending therethrough and resting on the bearing 48 in adjusted position held by the nut 50. On the outer end of the arm 47 is a bar 51 on which is mounted a slidable weight 52, held in adjusted position by a screw 53.

The support 45 carries a shaft 30 in a bushing 54. The shaft 30 carries the lens holder 29 on its upper end and has a hand nut 55 threaded to the threaded end of the shaft 30 for adjusting it longitudinally to move the lens holder 29 towards and away from the tool 32. The bushing 54 has a recess 56 therein containing the spring 43, which urges the shaft 30 and therefore the lens holder 29 towards the tool 32. A screw 57 which normally locks the shaft 30 in adjusted position, may be loosened to allow the shaft 30 to be rotated so as to position the dividing line 12 on the lens in desired relation with the tool edge and in substantial parallelism with the axis 35.

The support 45 is oscillated about the axis 35a by means of an eccentric shaft 38, which is pivotally attached to the support 45, preferably centrally thereof as indicated in Fig. 3 so as to provide substantially equal thrust on the bearings 48. The other end of the shaft 38 is eccentrically mounted at 37 on the wheel 57 to provide the back and forth drive of the support 45 about the axis 35a. Since it is necessary to provide a break up motion when grinding lenses, a Geneva type pickup is mounted on the pivot 37, having pickup spokes 58 for engagement with a stationary pin 59a so that the swing of the support 45 about the axis 35a is varied in length at each revolution of the wheel 57, due to the movement of the cam 59 which is moved to a different position each time one of the spokes 58 is moved by the tripping action against the pin 59a.

It will thus be seen that the lens holder 29 is oscillated by the eccentric shaft 38 and associated mechanism, and is rotatably adjustable to align the cliff edge in right angled relation with the trunnion axis 35a, as well as being longitudinally adjustable and resiliently held in adjusted position by the spring 43.

It is to be understood that the axes 35, 35a, and the longitudinal axis of the tool, preferably meet at a common point.

In Figures 4, 5 and 6 is illustrated a gauge and its operation in setting the lens holder 29 of Fig. 2 to the proper height. The gauge 71 consists of a horizontal bar 59b and a vertical bar 60 adjustable transversely thereof. These cross bars, in combination with a test block 61, are used to determine the proper position for the lens holder 29.

The bar 59b has a hollow portion 62 which contains a spring 63. A free end portion 64 slides in the hollow 62 against the action of the spring 63 so as to be urged outwardly, and is held therein by a pin 65 fixed in the bar 59b and extending into a slot 66 in the free end portion 64. The points 67 are adapted to engage depressions 68 in the faces 69 of the support 45. These depressions 68 are centered on the axis 35a. There is a scale 70, calibrated to suit the convenience of the operator, on the bar 60. The test block 61 is formed to the curvature to be ground.

The procedure followed in grinding the reading portion of the lens is, then, as follows: The gauge 71 is snapped into position on the support 45, as shown in Fig. 4, with the bar 60 adjusted to the radius of the curvature to be ground on the lens. A test block 61, having a face 73 formed to the curvature to be ground on the lens is placed in position on the shaft 30 as shown in Fig. 4. The shaft 30 is then adjusted, by means of the hand nut 55, until the gauge 71 may be swung across the surface of the test block, or vice versa, with the point 72 barely touching the surface.

The block 61 and the gauge 71 are then removed and the lens holder 29, to which the lens to be ground has been blocked, is positioned on the shaft 30 as shown in Fig. 2; and the tool 32 brought into contact with the lens to carry out the grinding operation through the motions previously described.

It is to be understood that the spindle 33 may be moved out of the way to make room for the gauge 71 in any desired manner, such as swinging, or complete temporary removal.

The test block 61 is preferably formed to a thickness which will bring its surface 73 to the position with respect to the axis 35a to which it is desired to bring the surface being ground on the lens, when finished. In other words, the test block 61 is so calculated and the height of the shaft 30 so set in accordance therewith, that, when the surface being ground on the lens is finished, if desired, the gauge, still at the same adjustment when used with the test block, may again be snapped into place in the support 45, and the point 72 will have the same relation with the finished lens surface as it previously had with the surface 73 of the test block.

The tool may, if desired, be positioned with its edge 42 removed from the line 12 of the lens and allowed to feed gradually towards said line 12 as it moves down through the lens. This may be accomplished by setting the screw 49 in the side arm 47 so as to hold the spindle 30 in desired angular position relative to the axis 35a, and setting the weight 52 on the shaft 51 to produce the desired pressure of the tool on the lens either in combination with the pressure already exerted by the spring 43, or by itself. The tool may thus be fed simultaneously into and across the lens, if desired.

It is to be understood that the feeding operations involved in forming the lenses of this invention may, if desired, be performed manually, instead of mechanically by the means shown or other suitable means.

In order to produce or maintain a cliff-like edge along the line 12 at the desired angle relative to the adjacent surfaces of the lens, the edge of the tool 32 is beveled, as shown at 42 in Fig. 2. This beveling makes it possible to tilt the tool sideways to bring its edge 42 to any desired point on the lens. It will be readily understood that, if an exact right angled cliff edge is desired, the angle of the bevel necessary at different tilted positions will vary. However, since the angle of the cliff edge may readily be conceived to be more effective at other than a right angle to achieve certain results such as diminishing of reflections, it has been found, that for practical purposes, one angle of the tool edge will produce, at different tilted positions, practical cliff angles within a considerable range, with the departure from right angularity being substantially negligible. It is to be understood, also, that greater departures from right angularity of the cliff edge may be accomplished, when desired, by properly angling the tool edge, while taking into consideration the amount of tilting of the tool. The tool 32 is carried by the spindle 33, rotated by the flexible shaft 34. The spindle is pivotably movable about the axis 35. The holder 29 is oscillated back and forth about the axis 35a in such a way as to carry the tool, which may be of the ring tool type, over the surface of field 2 in a direction substantially parallel with the line 12, see Fig. 1. The dotted lines 36 indicate the outline of the tool 32.

Fig. 7 shows a trifocal lens with surfaces 74, 75 and 76 which may be distance, intermediate and reading portions respectively or in any other desired order. In grinding or polishing a lens of this kind the field 74 is formed in a similar manner as the field 10 of the lens blank shown in Fig. 1. The lens blank is then mounted on a lens block and the field 75 ground and polished. The radius of curvature is gauged as shown in Fig. 4 and the same procedure followed as in the forming of the field 11 of the multifocal lens previously described in this specification. As before the center of oscillation, that is, the axis 35a is also the center of the curve to be formed. The lens holder is set to a distance from the center of oscillation equal to the radius to be formed, and as the lens is oscillated across the rotating tool, the correct curve is formed thereon. The radii of the surfaces or fields 74 and 75 having their centers on the axis passing through their line of joinder will permit the merging, centrally of the line of division 80, of the two surfaces 74 and 75 to make them monaxial, as are the two fields in the bifocal lens previously mentioned.

The curve 76 is ground in the same manner as the curve 75 without reblocking the lens. The lens holder is set to the proper angle with respect to and by pivoting about the axis 35 of the machine of Fig. 2, and the oscillation to the proper radius as previously described, and the same procedure is followed as for curve 75. Curve 76 is ground until it merges with the curve 75 centrally of the line of division 81.

Surfaces 75 and 76 will not be monaxial although the two curves do merge as described. This gives a condition known to the art as a "jump or image displacement" between surfaces 75 and 76. For some purposes this jump is not a sufficiently great disadvantage to make the lens an impractical one, since the lens may be formed inexpensively.

It will readily be seen that, if there is to be no jump, there must be one point at which the radii of the two curvatures lie along the same line, and this line must pass through the line of division of the surfaces. As may be seen in Fig. 10, the radius of the surface 76, having its center at 82 on the axis 79 passing through the line of division 80 between the surfaces 74 and 75, has only one position in which it may lie along the same line as the radius of the surface 75 which has its center at 78, and that is along the axis 79. Since this axis does not pass through the line of division 81, the surfaces 75 and 76 may merge, but will not be monaxial.

The final result in forming the lens as illustrated in Fig. 10 is a lens of one piece of glass, which, if a trifocal of the usual type is desired, will have three powers controlled in part by the surfaces 74, 75 and 76, which is free from color and all of the focal fields of which extend across the entire width of the lens.

Thus surfaces 74 and 75 will be monaxial or "jump-free." Surfaces 75 and 76 will merge at a point on their line of division 81, preferably centrally thereof but readily at any other point, thereon, but will not be monaxial and will have a slight jump which for some purposes is not impractical. Surfaces 74, 75 and 76 will be of different curvatures thereby giving different powers to the three surfaces. These may be any combination of curvatures desired, not necessarily all different.

In Figs. 8 and 9 is illustrated the forming of a trifocal lens similar to that illustrated in Fig. 10, from the same type of blank as shown in Fig. 10, with the difference that this lens is designed to be "jump-free" throughout.

The lens is Figs. 8 and 9 is designed to have three powers, with surfaces 74, 75 and 76 just as in the previously mentioned trifocal, and the same general advantages and alternatives apply, with the addition that surfaces 75 and 76 as well as 74 and 75, are made monaxial.

To grind or polish a lens of this kind which will be "jump-free" throughout, the lens is blocked on a two piece adjustable lens holder 83, see Fig. 8 and Fig. 9, the upper part 84 having the lens blocked upon it and being adjustable on the lower part 85 by means of a slot 86 in one of the two parts, and a bolt or pin 87 in the other. In this instance the slot is in the upper part 84 and the pin in the lower 85, but they may be in either. The lower part having the usual taper hub 88 which fits on the shaft 30 of Fig. 2. The surfaces 75 and 76 are made monaxial by adjusting the upper part 84 to offset position as shown in Fig. 9, when the surface 76 is ground, and by setting the grinding or polishing tool to the proper angle, as was described in connection with the previously mentioned trifocal and bifocal. The slot 86 is designed so that when the pin 87 is at one end thereof, as in Fig. 8, the lens is in proper relation to the tool 32 for the grinding of surface 75, and when the pin is at the other end of the slot the lens is in proper relation to the tool for the grinding of surface 76 so as to make it monaxial with surface 75 and so as to eliminate "jump" between surfaces 75 and 76 as well as 74 and 75.

In order to make the surfaces 75 and 76 monaxial at the same time that surfaces 74 and 75 are monaxial, the arrangement of centers of curvature of the various surfaces as illustrated in Figs. 8 and 9 is necessary. It will be noted that the centers 77 and 78 both lie on the axis 79 which passes through the line of division between surfaces 74 and 75, and that the centers 78 and 82 both lie on the axis 89 which passes through the line of division between surfaces 75 and 76.

What is done is simply this: when it is desired to form the surface 75, the lens holder is adjusted to bring the axis 79 in alignment with the axis 90 of the lens holder 83 so as to allow the axis 91 of the tool 32 to be aligned at one point with the axes 79 and 90. This makes it possible to form surfaces 74 and 75 monaxial. The lens holder is again adjusted by means of the slot 86 and pin 87 when it is desired to form the surface 76, so as to bring the axis 89 in alignment with the axis 90 of the lens holder 83 so as to allow the axis 91 of the tool 32 to be aligned at one point with the axes 89 and 90. This makes it possible to form surfaces 75 and 76 monaxial. Further surfaces may readily be formed by making possible further adjustments of the lens holder 83.

From the foregoing it will be seen that we have provided simple, efficient and economical means for obtaining all the objects and advantages of the invention.

Having described our invention, we claim:

1. A device of the character described comprising a main support, means for supporting a work holding spindle, said means being pivotally connected to the main support adjacent the upper end of said means and for swinging movement in one direction only, a work holder on said work holding spindle, means for adjusting said spindle in a direction longitudinally thereof while holding said spindle against rotation, said spindle being so disposed that the longitudinal axis thereof substantially intersects the axis of the pivot, means for supporting a rotatable tool supporting spindle, a tool carried by said spindle, said tool having an abrading surface of a diameter greater than the width of the resultant surface formed thereby, said spindle supporting means being pivoted about an axis disposed substantially normal relative to the axis of the pivot of the means for supporting the work holder and intersecting substantially the axis of said latter pivot, means for angling said tool supporting spindle to vary the angular relation thereof in given fixed positions with respect to the longitudinal axis of the work supporting spindle, means for retaining said tool supporting spindle in desired fixed angular adjusted position, means for rotating said spindle and means for imparting an oscillating movement to said means for supporting the work holding spindle in a single direction of movement relative to and transversely of the tool.

2. A device of the character described comprising a main support, means for supporting a work holding spindle, said means being pivotally connected to the main support adjacent the upper end of said means and for swinging movement in one direction only, a work holder on said work holding spindle, means for adjusting said spindle in a direction longitudinally thereof while holding said spindle against rotation, said spindle being so disposed that the longitudinal axis thereof substantially intersects the axis of the pivot, means for supporting a rotatable tool supporting spindle, a tool carried by said spindle, said tool having an abrading surface of a diameter greater than the width of the resultant surface formed thereby, said spindle supporting means being pivoted about an axis disposed substantially normal relative to the axis of the pivot of the means for supporting the work holder and intersecting substantially the axis of said latter pivot, means for angling said tool supporting spindle to vary the angular relation thereof with respect to the logitudinal axis of the work supporting spindle, means for retaining said tool supporting spindle in desired fixed angular adjusted position, and break-up motion means having an oscillating movement for oscillating said means for supporting the work supporting spindle in a single direction of movement relative to and transversely of the tool.

3. In a lens abrading machine for producing a lens having a substantially straight line of division between the different focal fields thereof, the combination of a main support, a yoke pivotally connected to the support adjacent the upper ends of the branches of said yoke for swinging movement in one direction only, a lens blank supporting spindle adjustably mounted in the base of the yoke for movement towards and away from the line of the axes of the pivots of the yoke, a bearing pivotally connected to the main support about an axial line substantially normal to and intersecting the line of the axes of the pivots of the yoke, a tool supporting spindle rotatably mounted in said bearing but held against longitudinal movement, a tool on said spindle having an abrading surface of a diameter greater than the width of the area of the focal field to be produced by said tool on the lens blank carried by the suporting spindle, means for adjusting the bearing and tool supporting spindle to a given fixed angular relation with the axis of the lens blank supporting spindle to position the edge of the tool overlying the lens blank at a given position relative to the lens blank to control the position of the line of division between the different focal fields, means for oscillating said lens blank supporting yoke in a single direction of movement about the axes of the pivots of the yoke relative to the tool and means for rotating said tool supporting spindle and the tool carried by said spindle during said oscillating movement.

4. In an abrading machine for producing a lens having a substantially straight line of division between the different focal fields thereof, the combination of a main support, a yoke pivotally connected to the support adjacent the upper ends of the branches of said yoke for swinging movement in one direction only, a spindle adjustably mounted in the base of the yoke with its longitudinal axis substantially normal to the line of the axes of the pivots of the yoke whereby said spindle may be moved towards and away from said line, a lens blank holder adjustably supported by the spindle whereby the surface of the lens blank carried by said holder and on which a focal field is to be formed may be tilted to desired fixed angular relation relative to the longitudinal axis of the spindle without changing the position at which the tool engages the blank, a bearing pivotally connected to the main support for tilting movement about an axial line substantially normal to and intersecting the line of the axes of the pivots of the yoke, a tool supporting spindle rotatably mounted in said bearing while held against longitudinal movement, a tool on said spindle having an abrading surface of a diameter greater than the width of the area of the focal field to be produced on said lens blank by said tool, means for adjusting and retaining the bearing to a given angular relation with the axis of the tool supporting spindle to position the edge of the tool overlying the lens blank at a given position relative to the blank to control the position of the line of division between the focal fields, means for oscillating said lens blank supporting yoke in a single direction of movement about the axes of the pivots of the yoke relative to the tool, means for rotating said tool supporting spindle and the tool carried by said spindle during said oscillating movement and means for moving the lens blank towards the tool and for controlling the extent of said movement during said tool rotating and yoke oscillating movement.

5. A device of the character described comprising a main support, means for supporting a work holding spindle, said means being pivoted adjacent its upper end to said main support for permitting said work holding spindle to be swung about the pivotal means as a center, a work holder on said work holding spindle, means for altering the arcuate path of movement of the work about said pivotal means as a center, said spindle being so disposed that the longitudinal axis thereof substantially intersects the axis of the pivot, means for supporting a rotatable tool spindle, said means being pivoted about an axis disposed substantially normal to the axis of the pivot of the means for supporting the tool holder and intersecting substantially said axis, means for retaining said tool supporting spindle in desired adjusted position relative to the work holding spindle, means for rotating said tool supporting spindle and means for imparting an oscillatory movement to said means for supporting the work holding spindle.

6. In a device of the character described, said device comprising a main support, a yoke pivoted to said support for swinging movement in one direction only about an axis held in a fixed meridian, a lens holder supported by the base of the yoke, a bearing pivotally connected to the support about an axis in a fixed meridional position substantially perpendicular to the axis of the yoke, with said axis intersecting substantially the axis of the yoke pivot, a tool supporting spindle rotatably mounted in said bearing with its longitudinal axis substantially intersecting the axis of the yoke pivot, a tool carried by said spindle, means for adjusting said bearing and the tool supporting spindle about said bearing pivot to a controlled fixed angular position with respect to the longitudinal axis of the lens holder to position the tool to overlie a given portion of a lens carried by said holder, said tool being of a diameter greater than the width of the portion of the lens engaged by the tool, means for rotating said tool while held in said fixed angular position relative to the lens and means for oscillating the yoke to move said lens in one direction only relative to the tool while holding said lens against rotation.

7. A device for grinding a blank for a one-piece multifocal lens having a pivoted member supporting a blank holder, a tool supporting member pivoted for tilting movement about an axis substantially at right angles to and substantially passing through the axis of the pivot of the member supporting the blank holder, a tool spindle rotatably mounted in said tool supporting member, means for rotating the tool while retaining said tool supporting member in a given angular position relative to the pivotal axis of said member supporting said blank holder, and means for imparting an oscillatory movement to the pivoted member supporting the blank holder while the blank holder is held against rotation, said oscillatory movement being along a single arcuate path about the pivotal axis of said member supporting the blank holder.

RALPH F. BARDWELL.
JOHN H. SMITH.